United States Patent [19]

Mao et al.

[11] 4,049,636

[45] Sept. 20, 1977

[54] THERMALLY STABLE POLYURETHANE ELASTOMER USEFUL IN MOLDING FLEXIBLE AUTOMOBILE EXTERIOR BODY PARTS

[75] Inventors: Chung-Ling Mao, Sandy Hook; Francis X. O'Shea, Naugatuck, both of Conn.

[73] Assignee: Uniroyal, Inc., New York, N.Y.

[21] Appl. No.: 661,212

[22] Filed: Feb. 25, 1976

[51] Int. Cl.$^2$ ............................................... C08G 18/04
[52] U.S. Cl. ..................... 260/77.5 CR; 260/77.5 AP; 260/859 R
[58] Field of Search .................. 260/859 R, 77.5 CR, 260/77.5 AP

[56] References Cited

U.S. PATENT DOCUMENTS

| | | |
|---|---|---|
| 3,933,937 | 1/1976 | Rhodes, Jr. et al. ......... 260/77.5 CR |
| 3,933,938 | 1/1976 | Rhodes, Jr. et al. ......... 260/77.5 AP |

*Primary Examiner*—Eugene C. Rzucidlo

*Attorney, Agent, or Firm*—James J. Long

[57] ABSTRACT

Flexible automobile exterior body parts are molded from a polyurethane elastomer prepared from a reaction mixture comprising:

a. a poly(oxypropylene)-poly(oxyethylene) glycol of molecular weight of from about 1500 to about 4000 containing 15 to 50% by weight oxyethylene groups;

b. a "graft" polyol of molecular weight from about 2500 to about 4500, prepared by the in situ polymerization of one or more ethylenically unsaturated monomers in a poly(oxypropylene) and/or poly(oxypropylene)-poly(oxyethylene) glycol containing less than 15% by weight oxyethylene groups;

c. methylenebis(4-phenylisocyanate);

d. 1,4-butanediol.

The invention also relates to this polyurethane elastomer.

4 Claims, No Drawings

THERMALLY STABLE POLYURETHANE ELASTOMER USEFUL IN MOLDING FLEXIBLE AUTOMOBILE EXTERIOR BODY PARTS

Flexible exterior body parts for automobiles, including parts associated with energy-absorbing bumper system such as sight shields, fender extensions and full fascia front and rear ends, require a material with a particular set of properties. The material must be capable of flexing under impact and then returning to its original shape. Therefore, it must be elastomeric in nature. It must have strength as typified by high tensile strength and high tear strength.

In addition, there are two more stringent requirements. It must be capable of withstanding dynamic impact at −20° F. and it must be resistant to distortion at 250° F. The latter requirement is imposed by typical conditions under which painted pieces are dried.

One class of materials which has been used for this purpose is polyurethane elastomers. Polyurethane elastomers are "block" type polymers resulting from the reaction of a polymeric diol of molecular weight of from about 500 to 5000 with a diisocyanate and a low molecular weight difunctional compound commonly referred to as the "chain extender". The chain extender has a molecular weight below 500 and generally below 300.

The polymeric diol is recognized as the "soft" segment of the elastomer, conferring elasticity and softness to the polymer. Typically, this component has a molecular weight of about 1000 to 2000 and may be a poly(alkylene ether) glycol such as poly(tetramethylene ether) glycol or poly(oxypropylene) glycol, a polyester diol, a polycaprolactone diol or polybutadiene diol.

Another class of polymeric diols recently described for use in polyurethane elastomers are "graft" polyols prepared by the insitu polymerization of ethylenically unsaturated monomers in a polyol. These products are described in U.S. Pat. No. 3,383,351 to Stamberger, May 14, 1968. Among the suitable polyols described are poly(oxypropylene) glycols and mixed poly(oxyethylene)-poly(oxypropylene) glycols (column 8, lines 28-30). Other representative patents describing the preparation of grafted polymer polyols and the polyurethanes made from these polyols are as follows:

U.S. Pat. No. 3,304,273, Feb. 14, 1967, Stamberger, is directed to the preparation of cellular polyurethanes by reacting a liquid polymer polyol with an organic polyisocyanate.

U.S. Pat. No. 3,823,201, July 9, 1974, Pizzini et al., describes the preparation of highly stable graft copolymer dispersions and the preparation of flexible polyurethane foams from these grafted polyols.

U.S. Pat. No. 3,523,093, Aug. 4, 1970, Stamberger, discloses a method for the preparation of polyurethanes. A mixture comprising a liquid polyol and a preformed normally solid, film-forming polymeric material is reacted with an organic polyisocyanate to form polyurethane foams.

U.S. Pat. No. 3,652,639, Mar. 28, 1972, Pizzini et al., discloses liquid graft copolymers prepared by the in situ polymerization of acrylonitrile in an unsaturated polyol and the polyurethane foam produced has improved load-bearing properties, as shown at Column 5, lines 30 through 40.

One big drawback of the thermoplastic polyurethanes based on styrene-acrylonitrile grafted poly(oxypropylene) glycols containing from 0 to about 15% by weight oxyethylene groups is their thermal instability at the elevated processing temperatures used for fabricating urethanes made from such polyols of molecular weight 2000 or greater.

While polyurethane elastomers as a class have excellent tear strength and tensile strength and can be designed to achieve the required modulus and elongation, not all polyurethane elastomers can meet the two requirements of low temperature impact resistance and resistance to heat distortion. In fact, a polyurethane elastomer based on poly(oxypropylene) glycol as the polymeric diol and 1,4-butanediol as the chain extender has not yet been used for flexible automobile body parts because of previous deficiencies of such an elastomer in these two areas. It is generally recognized (N.E. Rustad and R. G. Krawiec, Rubber Age, November 1973, pp. 45-49) that elastomers based on poly(oxypropylene) glycols have poorer low temperature properties than those based on poly(tetramethylene ether) glycol, another polyol used in polyurethane elastomers but higher in cost. One known way to improve the low temperture properties is to increase the molecular weight of the polyol while keeping the mole ratios of ingredients constant. Unfortunately, while the low temperature properties are indeed improved, the hardness and rigidity are normally lowered markedly. See Table II, page 47 of the Rustad et al. article.

In U.S. Pat. No. 3,915,937, O'Shea, Oct. 28, 1975, there is described a poly(oxypropylene) glycol based elastomer suitable for automobile flexible exterior body parts. Such a material can be prepared from a polyol of approximately 1750 to 2500 molecular weight, methylenebis(4-phenylisocyanate) and 1,4-butanediol, the molar ratio of butanediol to polyol being about 3.0:1 to 9.0:1. That patent is based on the fact that it was most unexpected to be able to make hard elastomers with the necessary high and low temperature properties from poly(oxypropylene) glycol.

While the specific formulation for a poly(oxypropylene) glycol based elastomer necessary to achieve the proper combination of properties had not been described previously, there had appeared a paper describing a similar concept applied to flexible automobile body parts using elastomers based on polycaprolactone diol as the polyol. This paper, by F. E. Critchfield, J. V. Koleski and C. G. Seefried, Jr., was presented at the Automobile Engineering Meeting of the Society of Automobile Engineers in Detroit, Michigan during the week of May 14-18, 1973. Summarizing their data on the polycaprolactone diol based elastomers, the authors stated "for automotive elastomer applications, the thermoplastic polyurethanes based on an approximately 2000 $M_n$ diol are more desirable since they show less modulus-temperature dependence in the use region." They also concluded: "Apparently at similar hard segment concentrations, the molecular weight of the urethane polymer soft segment has a greater effect on the temperature dependence of physical properties than the hard segment sequences." They attributed the unique properties of these materials to be the result of incompatibility on a microscopic scale between the hard and soft segments. In turn, "Incompatibility quite probably is due to the molecular weight of the soft segment being high enough to be immiscible in a thermodynamic sense with the hard segment."

Completely independent of the paper last mentioned above, it was found, in accordance with the above-cited O'Shea patent, that polyurethane elastomers suitable for the preparation of flexible automobile exterior body parts may be obtained from the reaction of a mixture comprising:

i. a polymeric diol selected from the group consisting of poly(oxypropylene) glycol and etylene oxide "tipped" poly(oxypropylene) glycol containing up to 10% by weight ethylene oxide and of molecular weight from about 1750 to about 2500 (preferably about 2000);

ii. methylenebis (4-phenylisocyanate);

iii. 1,4-butanediol.

In the O'Shea patent the effect of the polyol molecular weight on the required properties was demonstrated. It was shown that polymer based on 1000 molecular weight polyol failed in the low temperature impact and heat distortion tests while the polymer based on 2000 molecular weight polyol passed both tests. The acceptable range of polyol molecular weight was shown to be 1750 to 2500. An elastomer prepared from a 1500 molecular weight polyol was not acceptable with respect to low temperature impact while a polymer based on 3000 molecular weight polyol had lowered physical properties. The latter result was believed to be due to separation of soft and hard phases early enough in the polymerization to immobilize reactive end groups and thereby inhibit chain extension.

Although the polymers described in the O'Shea patent are useful and can be handled with reasonable care, they do suffer from one deficiency, that of poor thermal stability at processing temperatures. In normal use this deficiency may not present a serious problem and may even go unnoticed. However, since occasions may and often do arise in which material may be left in the barrel of an extruder or in an injection molding machine for extended periods at elevated temperatures, it would be advantageous for a material to have superior thermal stability. In this way it would be possible to leave the material in the machines at temperature during short shutdowns and then resume operations with no clean-out and waste necessary. In addition, it would insure that inferior parts would not be produced because of thermally induced decomposition of the elastomer during the process. This is especially of concern when it is desired to use "regrind".

In a copending application, Ser. No. 612,420 of O'Shea, filed Sept. 11, 1975 (now U.S. Pat. No. 3,983,094, issued Sept. 28, 1976), it was demonstrated that elastomers based on poly(oxypropylene)-poly(oxyethylene) glycols of oxyethylene group content 15% or more possess significantly better thermal stability than those based on polyols containing 10% or less oxyethylene group content. Particularly preferred were polyols containing 30% or more oxyethylene group content. It was found that this improvement in thermal stability could be achieved with no sacrifice in the properties essential to automobile flexible body part use. In fact, slightly better strength properties appeared to result from the use of polyols with higher ethylene oxide content.

We have now found, in accordance with the present invention, that this improvement extends to polymers based on blends of (a) poly(oxypropylene)poly(oxyethylene) glycols of oxyethylene group content 15% or more in admixture with (b) "graft" polyols prepared by the in situ polymerization of one or more ethylenically unsaturated monomers in a poly(oxypropylene) and/or poly(oxypropylene)poly(oxyethylene) glycol containing less than 15% by weight oxyethylene groups. Preferred (a) glycols are those of molecular weight 1500 to about 4000 and containing 15 to 50% oxyethylene groups by weight. Particularly preferred (a) glycols are poly(oxypropylene)poly(oxyethylene) glycols containing 25 to 50% oxyethylene group content.

Such mixed polyol based polymers provide additional surprising advantages in that the resultant elastomers possess improved processability and moldability, largely as a consequence of the fact that they have unexpectedly higher modulus and are harder at elevated temperatures than previously proposed compositions. These unexpected improvements can be important in allowing the molding of parts more economically through the use of shorter cycles.

Our invention, therefore, may be described in the following manner:

Polyurethane elastomers suitable for the preparation of flexible automobile exterior body parts may be obtained from the reaction of a mixture comprising:

a. a poly(oxypropylene)-poly(oxyethylene) glycol of molecular weight from about 1500 to about 4000 and containing 15% to 50% oxyethylene group content by weight;

b. a "graft" polyol of molecular weight from about 2500 to about 4500 prepared by the in situ polymerization of one or more ethylenically unsaturated monomers in a poly(oxypropylene) and/or poly(oxypropylene)-poly(oxyethylene) glycol containing less than 15% by weight oxyethylene groups;

c. methylenebis(4-phenylisocyanate);

d. 1,4-butanediol.

In order to study thermal stability the following test was devised. Polymer samples were molded into 3 inches × 4 inches × 0.07 inch plaques in a single cavity mold using a ½ oz. Newbury injection molding machine at barrel and nozzzle temperatures of from 400°-430° F. After several pieces were molded, material was allowed to stand in the barrel of the machine for twenty minutes at temperature. Then another molding was made. Tensile strength was measured on samples molded with and without this thermal treatment using standard ASTM procedures. When subjected to this test at about 400° F. typical elastomers of the invention retain at least twice as much of their original tensile strength as similar elastomers in which (a) is omitted or (a) is a poly(oxypropylene)-poly(oxyethylene) glycol containing 10% or less of oxyethylene group content.

The elastomers of the invention meet the requirements for flexible exterior body parts for automobiles. They have a hardness of about 40 to 55 Shore D, preferably 45 to 50 Shore D. They have an elongation greater than 300%, an ultimate tensile strength of about 3000 psi or greater and a Die C tear strength of 500 pli or greater.

Painted parts made from these elastomers remain intact under a 5 MPH impact at −20° F. To simulate the dynamic conditions involved in a 5 MPH impact at −20° F., a drop impact test system was developed. The unit consists basically of a vertical guide tube, a drop weight of appropriate design and associated instrumentation.

Polymers to be evaluated were molded into 2 inches × 6 inches × 0.08 inch specimens which were conditioned in an evironmental chamber to −20° F. and then fitted into two slots 3 inches apart so that the sample formed an inverted "U" with a total flexed height of 2 inches. The sample was impacted at its center line with a force of 50 ft. lbs., the weight traveling at greater than 5 MPH at impact. Drop height above the top of the sample was 38 inches. The drop weight is an 18 inch long cylinder weighing 16 lbs. It is 2.5 inches in diameter for 16.5 inches of its length and then tapers to a blunt end, which is the striking surface.

Polymers with inadequate low temperature impact resistance invariably fractured in this test. This test correlates well with the automobile manufacturer's testing where full size parts are made and mounted on a car or a portion of a car. After cooling to −20° F., the full size part is hit with a pendulum weight which is traveling at 5 MPH.

Parts made from the present elastomers also withstand paint oven temperatures of 250° F. without objectionable shrinkage or distortion. To evaluate materials for heat distortion characteristics, a sag resistance test (Heat Test O'S) was developed. The apparatus consists of a jig to hold a 2 inch × 6 inch × 0.08 inch injection molded sample in a horizontal plane. The sample is mounted with 4 inches suspended beyond the edge of the clamp. The jig with the sample is then placed in an oven pre-heated at 250° F. for ½ hour. The amount of sag is the difference in height from the end of the sample to a horizontal plane before and after exposure to heat. Experience with a material that was acceptable to automobile manufacturers has shown that polyurethane elastomers with a sag less than 2.0 inches by this test will perform satisfactorily in paint bake oven used to cure painted large automotive parts. The present elastomers meet this test.

The poly(oxypropylene)-poly(oxyethylene) glycol (a) used in the invention may be either a "tipped" polyol in which a poly(oxypropylene) glycol is reacted further with ethylene oxide giving rise to oxyethylene group blocks on each end of the polyol or a more random poly(oxypropylene)-poly(oxyethylene) glycol in which the propylene oxide and ehtylene oxide reactants are introduced together or in alternating portions. The preparation of both types of poyol is described in "Polyurethanes: Chemistry and Technology", Part I. Chemistry, by J. H. Saunders and K. C. Frisch, Interscience, New York, 1962, pp. 36-37. The technique of tipping is further described in "Advances in Urethane Science and Technology" by K. S. Frisch and S. L. Reegan, Technomic Publishing Company, Westport, Conn. 1973, pp. 188-193. The oxyethylene group content, regardless of position in the polyol, is a major factor in improved thermal stability.

The oxyethylene group content of the polyol (a) may range from 15% to 50%, preferably 25-50%, with the higher levels being preferred for the higher molecular weight polyols. For a 2000 molecular weight polyol the preferred oxyethylene group content is 25-45%. The poly(oxypropylene)-poly(oxyethylene) glycol (a) employed has, as indicated, a molecular weight of from about 1500 to about 4000.

The ethylenically unsaturated monomeric materials useful for grafting onto poly(oxypropylene) and/or poly(oxypropylene)-poly(oxyethylene) glycol to prepared polyol (b) are well known in the art and include the hydrocarbon monomers such as butadiene, isoprene, 1,4-pentadiene, 1,6-hexadiene, 1,7-octadiene, styrene, alphamethylstyrene, isopropylstyrene, butylstyrene, phenylstyrene, cyclohexylstyrene, benzylstyrene, and the like; substituted sytrenes such as chlorostyrene, 2,5-dichlorostyrene, bromostyrene, fluorostyrene, trifluoromethylstyrene, iodostyrene, cyanostyrene, nitrostyrene, N,N-dimethylaminostyrene, acetoxystyrene, methy 4-vinylbenzoate, phenoxystyrene, p-vinyl diphenyl sulfide, p-vinylphenyl phenyl oxide, and the like, the acrylic and substituted acrylic monomers such as acrylic acid, methacrylic acid, methylacrylate, methylmethacrylate, cyclohexyl methacrylate, benzyl methacrylate, isopropyl methacrylate, octyl methacrylate, methacrylonitrile, methyl alpha chloroacrylate, ethyl alpha-ethoxyacrylate, methyl alpha acetaminoacrylate, butyl acrylate, 2-ethylhexy acrylate, phenyl acrylate, phenyl methacrylate, alpha-chloroacryllonitrile,N,N,-dimethylacrylamide, N,N-dibenzylacrylamide, N-butylacrylamide, methacrylyl formamide, and the like; the vinyl esters, vinyl ethers, vinyl ketones, etc. such as vinyl acetate, vinyl chloroacetate, vinyl butyrate, isopropenyl acetate, vinyl formate, vinyl acrylate vinyl methacrylate, vinyl methoxy acetate, vinyl benzoate, vinyl iodide, vinyl toluene, vinyl naphthalene, vinyl bromide, vinyl fluoride, vinylidene bromide, 1-chloro-1-fluoroethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dhydro-1,3-pyran, 2-butoxy-2-vinyloxy diethyl ether, vinyl 2-ethylmercaptoethyl ether, vinyl methyl ketone, vinyl etyl ketone, vinyl phenyl ketone, vinyl etyl sulfide, vinyl ethyl sulfone, N-methyl-N-vinyl acetamide, N-vinyl-pyrrolidone, vinyl imidazole, divinyl sulfide, divinyl sulfoxide, divinyl suflone, methyl vinyl sulfonate, N-vinyl pyrrole, and the like; dimethyl fumarate, dimethyl maleate, maleic acid, crotonic acid, fumaric acid, itaconic acid, monomethyl itaconate, 1-butylaminoethyl methacrylate, dimethylaminoethyl methacrylate, glycidyl acrylate, dichlorobutadine, vinyl pyridine, and the like. Preferred materials are the vinyl aryl monomers (especially styrene and alpha-methyl styrene), the acrylic nitriles (especially acrylonitrile and methacrylonitrile), and the alkyl alkenoate esters (especially methyl and ethyl acrylate and methacrylate), Reaction conditions and free radical catalysts which may be used in the grafting reaction are described in the above-cited Stamberger patent on column 4, lines 15-50. The amounts of polymerized monomer in the graft polyol (b) may range from 5 to 50% by weight as described in the above patent on column 10, lines 2-3. The preferable concentrations is about 10% to 30%. The molecular weight of the poly(oxypropylene) and/or poly(oxypropylene)-poly(oxyethylene) glycol on which the monomer is grafted to make polyol (b) will vary from 2000 to 4000 with a preferred moleculr weight of about 2500 to about 3000. The glycol employed in making the graft (b) is selected from (i) poly(oxypropylene) glycol, (ii) poly-(oxypropylene)-poly(oxyethylene) glycol containing up to 15% oxyethylene groups, introduced either randomly or by "tipping" as described above, or (iii) a mixture of (i) and (ii) in any desired proportions (e.g., 90:10, 50:50, 10:90 etc.)

The ratio of (a) poly(oxypropylene)-poly(oxyethylene) glycol to (b) ethylenic monomer grafted polyol employed in the invention will range from about 10:90 to 90/10 by weight, with a preferred ratio of from about 80/10 to 40/60.

The molar ratio of chain extender (d) to polyol [(a) plus (b)] which may be used depends on the average molecular weight of the polyol mixture and is usually from 6 to 1 to 12 to 1. It ranges from 6 to 1 for a 2500 average molecular weight polyol mixture to 12 to 1 for a 4000 molecular weight polyol mixture. For example, the molar ratio of chain extender (d) to polyol for a 2800 average molecular weight polyol mixture ranges from 5 to 1 to about 9 to 1 with 6.0 to 8.0 being preferred. The NCO/OH ratio used to prepare the flexible thermoplastics may range from 0.95 to 1.10 with 1.00 to 1.05 being preferred.

A catalyst may or may not be used as desired. Some examples of useful catalysts are N-methyl-morpholine, N-ethyl-morpholine, triethyl amine, triethylene diamine (Dabco), N,N'-bis(2-hydroxylpropyl)-2-methyl piperazine, dimethyl ethanol amine, tertiary amino alcohols, tertiary ester amines, stannous octoate, dibutyl tin dilaurate and the like.

Polyurethane thermoplastics of this invention can be prepared utilizing either prepolymer or one-shot (masterbatch) technique. The prepolymer is formed by reacting an organic polyhydroxyl compound which is a mixture of (a) a poly(oxypropylene) poly-(oxyethylene) glycol and (b) an ethylenic monomer graft on poly(oxypropylene) and/or poly(oxypropylene)-poly(oxyethylene) glycol with an organic poly-isocyanate, e.g., methylenebis(phenylisocyanate) to form an isocyanate terminated prepolymer. The prepolymer is then treated with an equivalent amount of a low molecular weight polyol chain extender which is 1,4-butanediol and heated at elevated temperatures to effect a "cure". The one-shot or masterbatch system is effected by mixing polyhydroxyl compounds, chain extender and polyisocyanate together simultaneously at moderate temperatures and followed by curing at elevated temperatures.

Flexible polyurethane thermoplastics based on poly(oxypropylene)-poly(oxyethylene) glycol alone possess good physical properties as well as good thermal stability. However, this type of urethane is somewhat defensive in areas of processability and moldability. In particular, these polyurethanes possess a relatively low modulus (see Example 1, Table 1) and thus are difficult to release when they are injection molded into large complex articles.

Polyurethanes made from styrene-acrylonitrile grafted poly(oxypropylene) glycol on the other hand are found to have poor thermal stability (see Example 1, Table II). Unfortunately, physical properties of these polyurethanes are inferior after a normal thermal treatment at 400° F. for 20 minutes, and almost completely deteriorated at 430° for 20 minutes.

Unexpectedly, the flexible polyurethane thermoplastics of this invention made from blends of (a) poly(oxypropylene)-poly(oxyethylene) glycol and (b) ethylenic monomer grafted poly(oxypropylene) and/or poly(oxypropylene)-poly(oxyethylene) glycol exhibit a surprisingly unique combination of properties which neither (a) poly(oxypropylene)-poly(oxyethylene) glycol nor grafted polyol based polyurethane possess. Flexible polyurethane thermoplastics of this invention possess a unique combination of properties such as high tensile strength, high tear resistance, high elongation, good high temperature stability and low temperature flexibility, high resiliency, excellent processability, good moldability and paintability and the raw materials are low in cost. Flexible polyurethane thermoplastics of this invention may be smoothly processed and may easily be molded into large complex articles.

EXAMPLE I

Seven polyurethane thermoplastic elastomers, one from a 2000 molecular weight polyol containing 45% by weight ethylene oxide, one from a 3500 molecular weight grafted polyol containing about 10% by weight each of styrene and acrylonitrile and five from the mixture of above two polyols were prepared in the following manner.

Elastomer A

Two hundred thirty-six parts of a 2000 molecular weight poly(oxypropylene) glycol tipped with 45% by weight of ethylene oxide ("poly G-X 427" [trademark] from Olin Corp.) was dried at 212° F. under vacuum (~ 3 mm Hg) for one hour). The polyol then was cooled to 120° F. under a blanket of dry nitrogen and 192 parts of 4,4'-methylene bis(phenylisocyanate) was added. The mixture was heated at 176° F. for 1 hour under nitrogen atmosphere to form isocyanate-terminated prepolymer having an amine equivalent of 332.

To 400 parts of the prepolymer at 230° F. was added 54 parts of 1,4-butanediol at 140° F. The sample was well mixed for 30 seconds to 1.0 minute and poured onto a 12 × 12 × × 0.5 open mold and cured at 325° F. for 20 minutes.

The ratio equivalents of polyol/chain extender/diisocyanate in the final polymer was 1/5.5/6.5.

Elastomer B

Using the identical procedure as described for Elastomer A, 210 parts of a 3500 molecular weight poly(oxypropylene)-poly(oxyethylene) glycol containing about 12% by weight oxyethylene group grafted with about 10% by weight each of styrene and acrylonitrile ("Niax 24=" [trademark] obtained from Union Carbide Corporation) was allowed to react with 106 parts of 4,4'-methylenebis(phenyl isocyanate). Similarly, 300 parts of the prepolymer was cured with 30.5 parts of 1,4-butanediol.

The ratio of equivalents of polyol/chain extender/diisocyanate in the final polymer was 1/6/7.

Elastomer C

Again, the procedure used for Elastomer A was used for preparing Elastomer C, 280 parts of a 2000 molecular weight poly(oxypropylene) glycol containing 45% by weight of ethylene oxide and 210 parts of a 3500 molecular weight poly(oxypropylene)-poly(oxyethylene) glycol containing about 12% by weight oxyethylene group grafted with about 10% by weight each of styrene and acrylonitrile (Niax 24–32) were mixed together and dried. The polyol mixture then was allowed to react with 400 parts of 4,4'-methylenebis(phenyl isocyanate) under nitrogen atmosphere to form an isocyanate-terminated prepolymer. To 900 parts of the prepolymer at 230° F. was added 123 parts of 1,4-butanediol. The polymer was cured at 325° F. for 20 minutes. The ratio of equivalents of polyol/chain extender/diisocyanate in the final polymer was 1/7/8.

The resultant polymers (A, B and C) were then diced, dried for 2 hours at 230° F and injection molded into either 2 × 0.125 × 0.125 inch tensile bars in a four cavity mold or 3 × 4 × 0.08 inch plaques using a ½ oz. Newbury injection molding machine at barrel and nozzle temperature of 400° F to 430° F. In performing the thermal stability test, the polymer sample was allowed to stand in the barrel of the machine for 20 minutes at temperature. Physical properties were measured on samples molded with and without this thermal treatment. Properties of Elastomers A, B and C are summarized in Table I and the thermal stability of Elastomers A, B and C are presented in Table II in terms of stress-strain properties.

Table I
Physical Properties of Example I Elastomers

|  | A | B | C |
|---|---|---|---|
| Hardness (Shore D) | 45 | 45 | 45 |
| 100% Modulus | 1200 | 1570 | 1880 |
| 300% Modulus | 2100 | 2800 | 2900 |
| % Elongation | 450 | 420 | 440 |
| Tensile | 3800 | 3900 | 4100 |
| Die C Tear | 750 | 3900 | 4100 |
| −20° F. Impact | Pass | — | Pass |
| Heat Sag Test | Pass | — | Pass |

Table II
Physical Properties of Example I Elastomers After Heat Treatment

|  | Elastomer A | Elastomer B | Elastomer C |
|---|---|---|---|
| Tensile | 3620 | 1084 | 3800 |
| 100% Modulus | 1150 | 931 | 2032 |
| 300% Modulus | 2050 | — | 3016 |
| Elongation % | 400 | 167 | 420 |

In Table II, Elastomer A was heat treated at 400° F. for 20 minutes. This polymer had very low viscosity at 430° F. Elastomer B was heat treated at 400° F. for 20 minutes. This polymer was found to be completely degraded at 430° F. for 20 minutes. No sample could be molded. Elastomer C was heat treated at 430° F. for 20 minutes.

In Table II, the advantages of Elastomer C over Elastomers A and B are well demonstrated. For example, Elastomer C showed a much higher modulus (stress-/strain properties) than that of Elastomer A with other properties being equivalent or better. In Table II, the thermal instability of Elastomer B was established whereas Elastomer C was thermally stable even at a relatively higher temperature. It is also noted that Elastomer A stuck a little bit (too soft) when injection molded while Elastomer C molded without difficulty.

Four more polymers were prepared based on the polyol mixtures of ethylene oxide (45%) tipped poly(oxypropylene) glycol (EO-PPG) and styrene-acrylonitrile grafted polyol (Graft PPG) as described above in the preparation of Elastomer C with various mixtures. Physical properties of these polymers are summarized in Table III.

Table III
Elastomers Prepared at Various Ratios

|  | D | E | F | G |
|---|---|---|---|---|
| EO-PPG/Graft PPG | 80/20 | 70/30 | 50/50 | 33/67 |
| Hardness (Shore D) | 44 | 47 | 45 | 46 |
| 100% Modulus | 1410 | 1772 | 1910 | 1600 |
| 300% Modulus | 2700 | 2730 | 2840 | 2560 |
| Elongation % | 440 | 450 | 430 | 450 |
| Tensile | 4160 | 4010 | 3900 | 3700 |
| Die C Tear | 850 | 995 | 721 | 814 |

EXAMPLE II

In this example, a polyol mixture of 130 parts of a 1510 molecular weight poly(oxypropylene) glycol containing 15% ethylene oxide and 130 parts of the styrene-acrylonitrile grafted polyol (as described in Example I) was allowed to react with 216 parts of 4,4'-methylenebis-(phenyl isocyanate) to form an isocyanateterminated prepolymer. 470 parts of the prepolymer then was cured with 65 parts of 1,4-butanediol. The ratio of equivalents of polyol/chain extender/diisocyanate in the final polymer was 1/6/7. Physical properties of the elastomer were as follows:

Hardness (Shore D): 48
100% Modulus: 2528
300% Modulus: 3315
Elongation %: 400
Tensile: 3890
Die C Tear: 837

EXAMPLE III

In a similar manner, as that described in Example I (Elastomer C), a mixture of 130 parts of 1800 molecular weight poly(oxypropylene) glycol tipped with 30% by weight of ethylene oxide and 130 parts of a 3500 molecular weight polyol grafted with 10% by weight of each of styrene and acrylonitrile (Niax 24-32) was allowed to react with 222 parts of 4,4'-methylenebis(phenyl isocyanate). To 475 parts of the prepolymer was added 67.3 parts of 1,4-butanediol. The polymer was cured at 325° F for 20 minutes. The ratio of equivalents of polyol/-chain extender/diisocyanate in the final polymer was 1/7/8. Physical properties of the polymer were as follows:

Hardness (Shore D): 44
100% Modulus: 2328
300% Modulus: 3337
% Elongation: 370
Tensile: 3805
Die C Tear: 862

EXAMPLE IV

A mixture of 130 parts of a 3020 molecular weight poly(oxypropylene) glycol containing 30% ethylene oxide and 130 parts of a 3500 molecular weight polyol grafted with 10% by weight each of styrene and acrylonitrile (Niax 2432) was allowed to react with 200 parts of 4,4'-methylenebis (phenyl isocyanate). The prepolymer (450 parts) was then cured with 60.3 parts of 1,4-butanediol to form a polyurethane thermoplastic elastomer. The ratio of equivalents of polyol/chain extender/diisocyanate in the final polymer was 1/9/10. Physical properties of the elastomer were as follows:

Hardness (Shore D): 43
100% Modulus: 1790
300% Modulus: 2660
Elongation %: 430
Tensile 3100
Die C Tear: 698

EXAMPLE V

A mixture of 130 parts of a 4000 molecular weight poly(oxypropylene) glycol containing 45% ethylene oxide and 130 parts of a 3500 molecular weight polyol grafted with 10% by weight each styrene and acrylonitrile (Niax 24-32) was reacted with 177 parts of 4,4'-methylenebis (phenyl isocyanate). Four hundred thirty parts of the prepolymer was then reacted with 54 parts of 1,4-butanediol to form an elastomer with a ratio of equivalents of polyol/chain extender/diisocyanate being 1/9/10. Physical properties of the polymer were as follows:

Hardness (Shore D): 40
100% Modulus: 1530
300% Modulus: 2400

Elongation %: 430
Tensile: 3100
Die C Tear: 698

EXAMPLE VI

This example demonstrates the use of a different ratio of styrene-acrylonitrile graft on poy(oxypropylene)poly(oxyethylene) glycol for the preparation of polyurethanes of this invention. Thus, a mixture of 150 partsof a 2000 molecular weight poly(oxypropylene) glycol containing 45% ethylene oxide and 150 parts of a 3480 molecular weight poly(oxypropylene)-poly(oxyethylene) glycol, containing 12% oxyethylene groups, grafted with 5% of styrene monomer and 15% of acrylonitrile monomer were allowed to react with 207 parts of 4,4'-methylenebis(phenyl isocyanate) to form an isocyanateterminated prepolymer. Five hundred parts of the prepolymer was then cured with 60 parts of 1,4-butanediol to give a polymer with a ratio of equivalents of polyol/chain extender/diisocyanate being 1/6/7. Physical properties of the polymer were as follows:

Hardness (Shore D): 40
100% Modulus: 1424
300% Modulus: 2340
Elongation %: 460
Tensile: 3406
Die C Tear: 750

EXAMPLE VII

This example illustrates the preparation of polyurethanes of this invention using a one-shot or masterbatch technique.

A mixture of 350 parts of a 2000 molecular weight poly(oxypropylene) glycol containing 45% ethylene oxide and 150 parts of a 3500 molecular weight polyol grafted with 10% by weight each of styrene and acrylonitrile (described in Example I) was dried at 212° F. under vacuum (~ 3 mm Hg) for one hour. To this polyol mixture was added 136 parts of 1,4-butanediol. The temperature of the mixture being maintained at 230° F., 431 parts of 4,4'-methylenebis(phenyl isocyanate) at 140° F. was then added. The mixture was allowed to mix well for 30 seconds and poured onto an open mold (12 × 12 × 0.5 inch) and cured at 325° F. for 20 minutes. The ratio of equivalents of polyol/chain extender/diisocyanate in the final polymer was 1/7/8. The polymer ws processed and injection molded. Physical properties of the polymer are summarized below:

Hardness (Shore D): 45
100% Modulus: 1850
300% Modulus: 2600
Elongation %: 455
Tensile: 3400
Die C Tear 850

The automotive flexible body parts, which are a desired end-product of this invention, are fabricated by injection molding using the already prepared polyurethane thermoplastic elastomer as the molding material. The polymer is made into small dice or pellets suitable for feeding into injection molding machines. Using the same preformed material, an automotive part may also be made by extrusion techniques including profile extrusion and sheet extrusion followed by vacuum forming. Moreover, the automotive part may also be prepared by "Reaction Injection Molding (RIM)" techniques, in which the reactants are rapidly injected into a mold wherein they cure to form the shaped thermoplastic elastomeric article directly. In this "RIM" method, the polyol, chain extender and diisocyanate may be reacted in one step (one-shot method) or the polyol and diisocyanate may be prereacted to form a prepolymer and then injected along with the chain extender to form the molded articles (prepolymer method).

We claim:

1. A thermally stable polyurethane elastomer which is a reaction product of: (a) a poly(oxypropylene)poly(oxyethylene) glycol of molecular weight of from about 1500 to about 4000 and containing from 15% to 50% oxyethylene groups by weight; (b) a graft polyol of molecular weight from about 2500 to about 4500, prepared by the in situ polymerization of ethylenically unsaturated monomeric material in a glycol selected from the group consisting of (i) poly(oxypropylene) glycol, (ii) poly(oxypropylene)-poly(oxyethylene) glycol containing less than 15% by weight oxyethylene groups, and (iii) a mixture of poly(oxypropylene) glycol and poly(oxypropylene)-poly(oxyethylene) glycol containing less than 15% by weight oxyethylene groups, the amount of polymerized monomer in the graft polyol being from 5 to 50% by weight; (c) methylenebis(4-phenylisocyanate); and (d) 1,4-butanediol; the ratio of (a)/(b) being from about 90/10 to 10/90 by weight, the NCO/OH equivalents ratio being from 0.95 to 1.1, and the molar ratio of (d) to (a) plus (b) being from 6/1 to 12/1, said elastomer having a hardness of about 40 to 55 Shore D, an elongation of greter than 300%, an ultimate tensile strength of at least 3,000 psi and a Die C tear strength of at least 500 pli, said elastomer displaying improved thermal stability as evidenced by its ability to retain at least twice as much of its original tensile strength, after exposure to a temperature of 400° F. for 20 minutes, as a similar elastomer in which (a) contains 10% or less of oxyethylene groups or in which (a) is omitted.

2. A thermally stable polyurethane elastomer as in claim 1 in which the ethylenically unsaturated material in (b) is a mixture of styrene and acrylonitrile, each present in amount of 10% by weight.

3. A thermally stable polyurethane elastomer as in claim 1 in which the oxyethylene group content in (a) is 30–45%.

4. A shaped article prepared from the thermally stable polyurethane elastomer of claim 1 and characterized, when having a thickness of 0.08 inch, by remaining intact under a 5 mile per hour impact at −20° F. and by having a sag of less than two inches as determined by Heat Test O'S.

* * * * *